US006257428B1

(12) United States Patent
Caola

(10) Patent No.: US 6,257,428 B1
(45) Date of Patent: Jul. 10, 2001

(54) CONTAINER FOR SEPARATION, STORAGE AND MIXING OF INGREDIENTS

(76) Inventor: Joseph P. Caola, 26 Farmington Dr., Shrewsbury, MA (US) 01545

( * ) Notice: Subject to any disclaimer, the term of this patent is extended or adjusted under 35 U.S.C. 154(b) by 0 days.

(21) Appl. No.: 09/380,521

(22) PCT Filed: Mar. 4, 1998

(86) PCT No.: PCT/US98/04173

§ 371 Date: Sep. 3, 1998

§ 102(e) Date: Sep. 3, 1999

(87) PCT Pub. No.: WO98/38962

PCT Pub. Date: Sep. 11, 1998

Related U.S. Application Data

(63) Continuation of application No. PCT/US98/04173, filed on Mar. 4, 1998, and a continuation of application No. 08/812,118, filed on Mar. 4, 1997, now Pat. No. 5,794,802.

(51) Int. Cl.[7] .............................. A61J 9/00; B65D 25/08

(52) U.S. Cl. .............................. 215/11.1; 215/DIG. 8; 206/219; 206/221

(58) Field of Search .............................. 222/81, 83, 129, 222/511; 215/DIG. 8, 11.1; 206/219, 221

(56) References Cited

U.S. PATENT DOCUMENTS

| | | | | |
|---|---|---|---|---|
| 2,793,776 | * | 5/1957 | Lipari | 215/11.1 |
| 2,813,649 | * | 11/1957 | Lipari | 215/DIG. 8 |
| 3,220,588 | * | 11/1965 | Lipari | 215/DIG. 8 |
| 3,439,823 | * | 4/1969 | Morane | 215/DIG. 8 |
| 3,539,794 | * | 11/1970 | Rauhut et al. | 206/221 X |
| 4,024,952 | * | 5/1977 | Leitz | 206/221 |
| 4,203,517 | * | 5/1980 | Hildebrandt et al. | 215/DIG. 8 |
| 4,315,570 | * | 2/1982 | Silver et al. | 215/DIG. 8 |
| 4,550,825 | * | 11/1985 | Sutryn et al. | 206/222 X |
| 4,614,267 | * | 9/1986 | Larkin | 206/221 X |
| 5,634,714 | | 6/1997 | Guild . | |
| 5,794,802 | * | 8/1998 | Caola | 215/11.1 |
| 5,863,126 | * | 1/1999 | Guild | 206/221 X |
| 6,113,257 | * | 9/2000 | Sharon et al. | 206/221 X |

FOREIGN PATENT DOCUMENTS 1514686 5/1968 (FR) .

OTHER PUBLICATIONS

PCT IPEA/EP Written Opinion PCT/US98/04173, Dec. 8, 1998.

Caola Response to IPEA Written Opinion Mailed Dec. 8, 1999, PCT/US98/04173, Mar. 8, 1999.

Caola Submission of Possibly Pertinent Art, PCT/US98/01473, May 5, 1999.

* cited by examiner

*Primary Examiner*—Allan N. Shoap
*Assistant Examiner*—Tri M. Mai
(74) *Attorney, Agent, or Firm*—Blodgett & Blodgett, P.C.

(57) ABSTRACT

A reusable insert designed for off-the-shelf covered containers, such as infant feeding bottle having a storage compartment for powdered formula, a top opening (32) to the compartment, a bottom opening (36) to the compartment, closure (40) for closing the bottom opening (35), and an actuator (20) that is guided for vertical movement within the housing for operative engagement with the closure. The upper end of the actuator extends below the nipple which is attached to the infant feeding bottle so that the user can apply downward pressure on the actuator through the nipple. Downward movement of the actuator causes the closure to move from its upper closed position at the bottom opening to a lower open position spaced from the bottom opening of the housing to enable powdered formula to be released into the chamber of the infant feeding bottle.

8 Claims, 8 Drawing Sheets

CONTAINER FOR SEPARATION, STORAGE AND MIXING OF INGREDIENTS

This application is the U.S. National Stage Under 35 U.S.C. §371 of PCT Application No. PCT/US98/04173 filed Mar. 4, 1998 and also claims the benefit of 35 U.S.C. §120 of prior U.S. Pat. No. 5,794,802 issued Aug. 18, 1998 (Ser. No. 08/812,118, filed Mar. 4, 1997.

FIELD OF THE INVENTION

This invention relates to the storage, mixing, and dispensing of materials and more specifically, to an infant feeding bottle used to keep powdered formula and water separated until it is ready to be consumed when it can be mixed in the same bottle and dispensed as desired.

BACKGROUND OF THE INVENTION

There are many circumstances which necessitate keeping ingredients separated in a container until they are ready to be mixed and dispensed. As an example, when using powdered baby formula, it is necessary to mix the formula with water for producing a milky liquid which is consumed by infants and small children. Once the formula is mixed, it must be consumed within a short period of time or refrigerated.

Typically, when traveling with an infant, feeding times are not precisely known and infants are fed on demand. The feeding time is normally indicated by urgent cries from the child and it is important not to delay. Many times, the infant will not eat if it is too upset. On the road, feeding a child using powdered formula can get complicated and messy as you have to measure the required amount of formula from a can and pour this into a baby bottle containing water. Formula can be mixed ahead of time and stored in a portable insulated carrier but the formula should be consumed within two hours. This time can be extended by placing an ice pack with the formula. After the formula has been refrigerated, it is usually necessary to heat it to at least room temperature before it is consumed. Even as the child develops and feeding times are easier to plan, it can be very difficult to feed the child while on the road. Considering the number of bottles a child consumes in a day, any apparatus designed to assist the parent in feeding should be easy to clean and relatively inexpensive.

Previously, a number of containers for storing, mixing, and dispensing have been designed. French Pat. No. 1 514 686 shows a container for mixing dry and wet ingredients destined to be drawn into a medicine dropper-like element. It is not suitable for infant feeding. U.S. Pat. No. 2,793,776 to Lipari, 1957 includes a stopper which restricts the adequate mixing of ingredients and is very difficult to clean. U.S. Pat. No. 5,275,298 to Holley, 1994 uses an attachment affixed to the top of a conventional infant feeding bottle which extends the height considerably and makes it cumbersome to use. The apparatus is difficult to operate, hard to clean, and has many parts which makes it more expensive to manufacture. U.S. Pat. No. 5,419,445 to Kaesemeyer has many parts as well. The apparatus uses a screw type mechanism to release a cap from the bottom of the dry chamber. As designed, the cap would require close manufacturing tolerances during production and could easily leak. The screw-type operation also makes it more time consuming to take apart for cleaning.

None of the devices in the prior art mentioned above are very easy to clean or use. Use and ease of cleaning are necessities to be considered when designing an apparatus to be utilized so many times during each day. Designs with too many parts make it frustrating for the consumer to assemble the apparatus each time it is used. Numerous parts also demand higher costs and can lead to a higher incidence of parts getting lost which could render the device inoperative. Infants can be fed about eight times each day or more. Parents normally do not have the time to wash the apparatus between bottles. Lower costs can eliminate this requirement by making it reasonable to purchase more than one apparatus.

A primary object of this invention is the provision of a powdered formula storing and dispensing insert for an infant feeding bottle which keeps powdered formula and water separated until it is ready to be consumed at which time the powdered formula and water can be mixed in the bottle and dispensed.

A further object of the invention is the provision of a powder storing and dispensing insert for an infant feeding bottle that has a minimum of parts.

A further object of the invention is the provision of a powder storing and dispensing insert for an infant feeding bottle that includes components that are easy to assemble.

A further object of the invention is the provision of a powder storing and dispensing insert for an infant feeding bottle that is be easy to clean.

A further object of the invention is the provision of a powder storing and dispensing insert for an infant feeding bottle in which all of the parts of the insert fit together in such a way that manufacturing tolerances are easily met.

A further object of the invention is the provision of a powder storing and dispensing insert for an infant feeding bottle which can be activated through the nipple.

A further object of the invention is the provision of a powder storing and dispensing insert for an infant feeding bottle which provides a method to prevent the dry powder from entering and clogging the nipple.

SUMMARY OF THE INVENTION

An insert to be used in conjunction with off-the-shelf infant feeding bottles. The insert includes a housing having a compartment within which the dry powdered formula can be stored and a bottom opening to the compartment. The housing has a size and shape that fits into the chamber of an infant feeding bottle between the cap/nipple assembly and the lower portion of the bottle. The insert also includes a closure for closing the bottom opening of the housing and an actuator to release the closure. The housing and closure seal together to form a cup-like container which stores the powdered formula prior to mixing the formula with water in the chamber of the bottle. The actuator for releasing the closure is actuated through the nipple with either a push action or a combination of push/rotary action. The insert is assembled by the user and filled with a measured amount of powdered formula. The insert is placed within the open neck of the bottle which contains a pre-measured amount of water and the cap containing the nipple is screwed in place. To mix the ingredients, the user pushes on the nipple which displaces the closure to provide a channel between the compartment of the housing and the chamber of the bottle. The bottle is shaken and the powdered formula and water are mixed.

BRIEF DESCRIPTION OF THE SEVERAL VIEWS OF THE DRAWING

The present invention will be better understood by reference to the drawings in which.

DETAILED DESCRIPTION OF THE INVENTION

Figure 1:
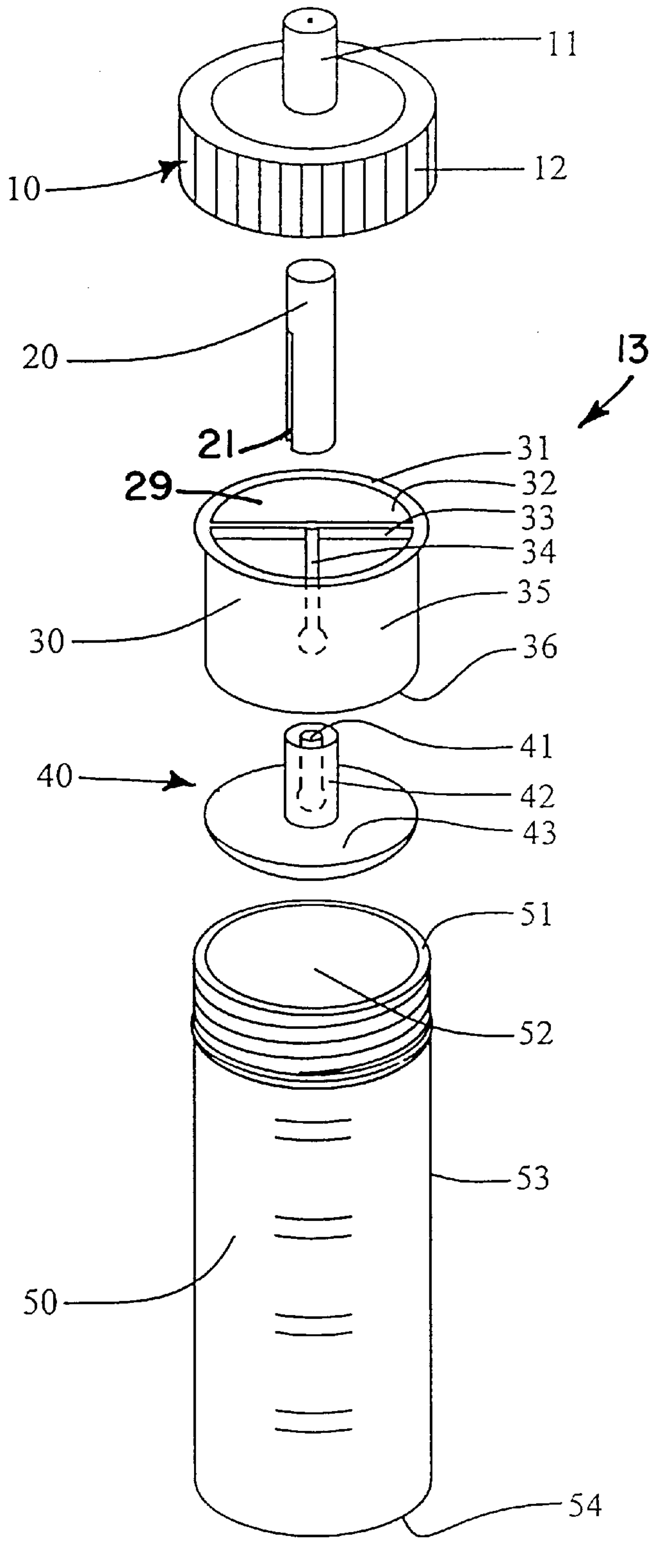
FIG. 1 is an exploded perspective view of an insert embodying the principles of the present invention is shown in conjunction with an off-the-shelf infant feeding bottle.
Figure 2:
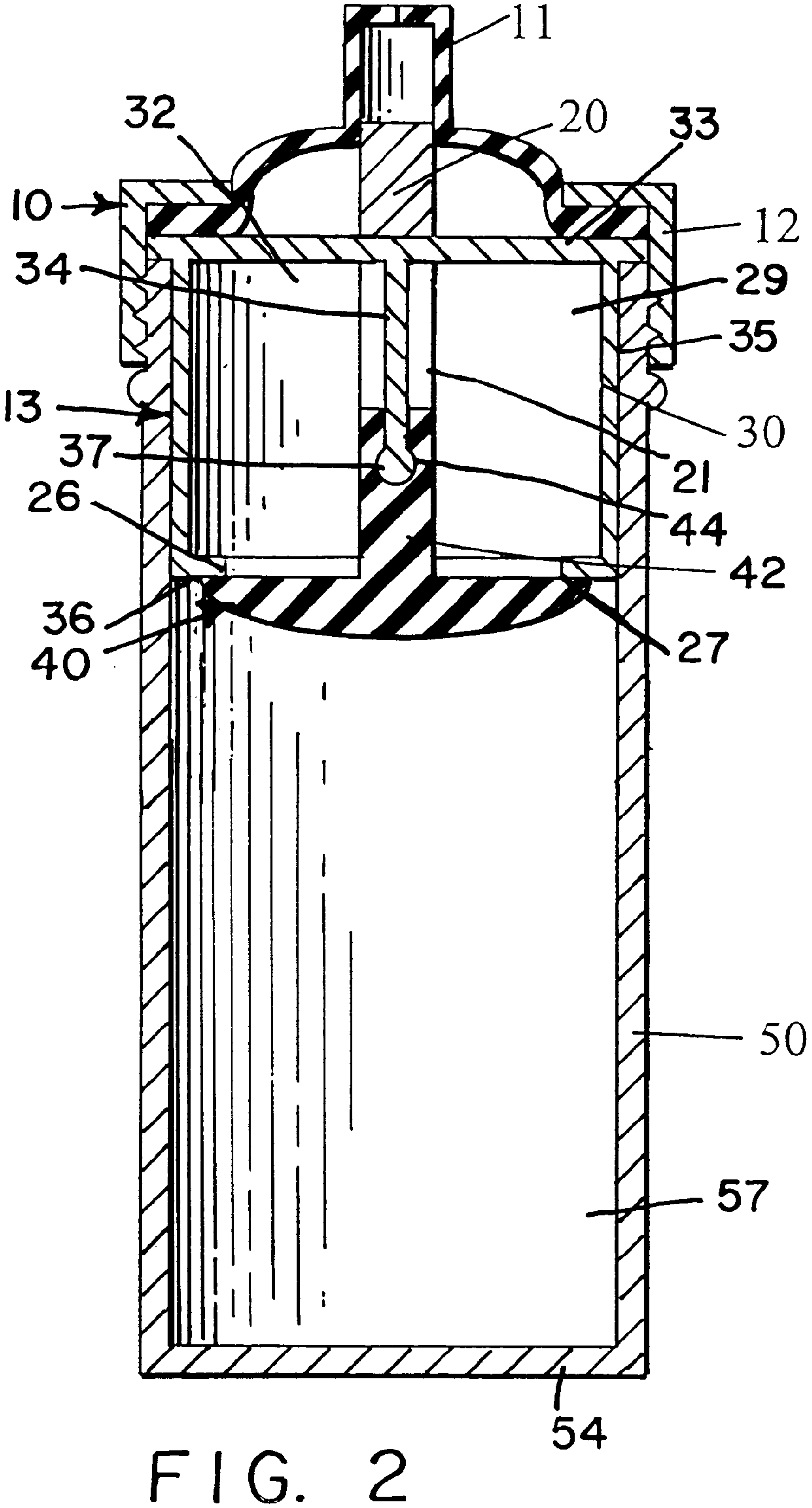
FIG. 2 is a vertical cross-sectional view of the assembled insert used in conjunction with an off-the-shelf infant feeding bottle.

FIG. 1 shows an insert used in conjunction with an off-the-shelf infant feeding bottle. The off-the-shelf bottle is comprised of a bottle 50, and a nipple assembly, generally indicated by the reference numeral 10. The nipple assembly 10 normally screws directly to the bottle which has a lip 51 and pinches the rubber nipple 11 between the lip 51 of the bottle and the base 12 of the nipple assembly 10, thereby forming a leak-proof seal. The bottle 50 has a chamber 57 and a bottom wall 54 so that liquid can be poured directly into the bottle. The bottom of the bottle can also be open to accommodate a disposable bag. When a disposable bag is used, it is pulled over the lip or top edge 51 of the open neck of the bottle 50 and the nipple assembly 10 is screwed in place. The bag is pinched between the nipple assembly 10 and the upper lip 51 of the bottle 50, forming a leak-proof seal. FIG. 2 shows a cross-sectional view of the assembled bottle and the insert of the present invention.

As shown in FIG. 1, the insert of the present invention is generally indicated by the reference numeral 13 and is comprised of a dry chamber housing 30, an elastomeric closure or seal, generally indicated by the reference numeral 40, and an actuator or push rod 20. The housing 30 has a compartment 29, a top opening 32 and a bottom opening 27 surrounded by an annular inwardly facing flange 26. The housing 30 has a horizontal strut or cross piece 33 that extends across the top opening 32 and a vertical shaft or retaining member 34 extending downwardly from the center of the cross piece 33. The seal 40 seals against the lower rim 36 of the dry chamber housing 30, forming a cup-like container which holds the dry powder formula. The user attaches the seal 40 to the dry chamber housing 30 by forcing the enlargement 37 into the cavity 44 through the opening 41. The user then fills the sealed chamber or compartment with a measured amount of powdered formula. After the compartment 29 of the housing 30 has been filled with powdered formula, the user attaches the push rod to the housing so that the cross rod 33 enters the slot 21 and the insert is completely assembled. The insert is of a width and shape which allows the user to slide it into the chamber 57 through the top opening 52 of the bottle. An outwardly extending annular flange 31 is located at the top of the housing 30 for resting on the lip or top edge 51 of the bottle 50. The length of the dry chamber housing 30 can be varied, depending on the size of the bottle it is used with. Most infant feeding bottles are either four or eight ounces. Powdered formula is usually mixed using a ratio of two ounces of water to one scoop of formula. Using this convention, the length of the insert needs only to be long enough to hold two scoops of formula for the four ounce bottle and four scoops of formula for the eight-ounce bottle but any length or size may be used.

The lip 51 of the bottle and the nipple assembly 10 contact the flange 31 of the dry chamber housing 30 to form a leak proof seal at the top of the housing 30. A gasket or other material may be used between the lip 51 and the flange 31 to enhance the seal if necessary. After the assembled insert 13 is placed into the chamber 57 through the top opening 52 at the neck of the bottle, the user screws the nipple assembly 10 over the assembled insert to complete the seal. When it comes time to feed the infant, the user pushes the rod 20 downwardly through the nipple 11 so that the rod 20 applies downward pressure to the vertical element 42 of the seal 40. The seal 40 is moved downwardly relative to the shaft 34 to open a space between the horizontal element 43 of the seal 40 and the lower rim 36 of the dry chamber housing 30. This space creates a channel between the chamber 57 of the bottle 50 and the compartment 29 of the dry chamber housing 30 and enables the water and powdered formula to be mixed by shaking the bottle assembly.

Figure 3:
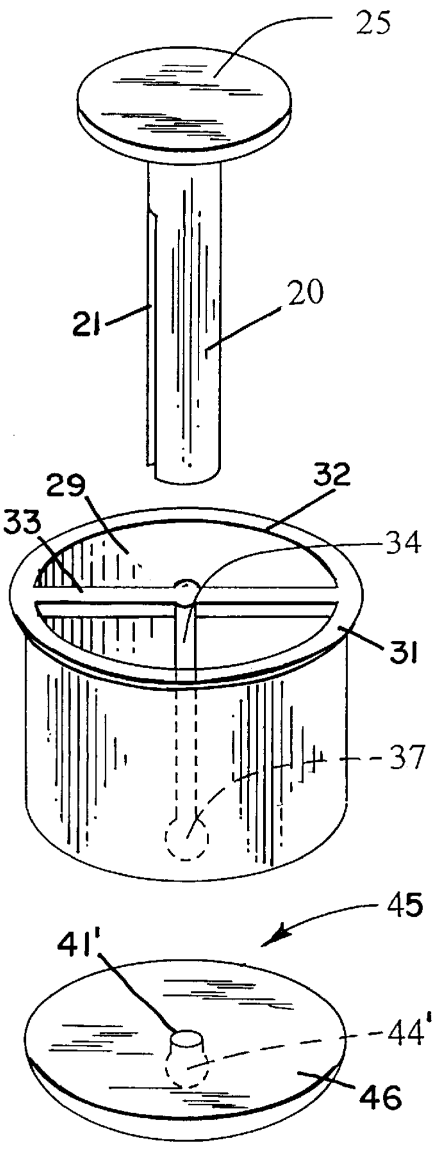
FIG. 3 is an exploded perspective view of a first modification of the insert.

Depending on the application as well as personal preferences, the length of the vertical element 42 of the seal 40 and the vertical shaft or retaining member 34 on the dry chamber housing 30 can be varied to provide several options to the design. One option, such as the embodiment of FIGS. 1 and 2, allows the seal 40 to stay in place on the vertical shaft 34 as the formula and water mixture or milk formula is being consumed. The cavity 42 is vertically elongated to enable the seal 40 to be moved downwardly away from the bottom opening 36 and to be retained by the vertical shaft 34. The milk formula flows around the seal 40 and through the open channel to the nipple. Another option has a shorter vertical shaft 34 and/or vertical element 42 to permit the seal 40 to slide off the end of the vertical shaft 34, allowing the seal 40 to drop into the bottle 50. The seal 40 then acts as an agitator to assist in mixing the powdered formula and water. The purpose of the vertical element 42 varies depending on the configuration. The vertical element 42 can enhance the integrity of the seal 40 to prevent water from entering the compartment of the housing during the storage interval. The vertical element can also provide a stable support to suspend the seal 40 while the formula is being consumed and it should keep the seal 40 from blocking the flow of milk formula when using the agitator option. If desired, the vertical element 42 may be eliminated, as shown in FIG. 3. The embodiment of the seal 40 is used with a means to release the chamber seal such as an actuator or push rod 20. The vertical shaft 34 has an enlargement 37 on the end while the horizontal element 43 of the seal 40 has an opening 41' to a cavity 44' for receiving the enlargement 37. The mating surfaces are engaged during storage. When it is time to dispense the powdered formula, the user pushes on the push rod 20 through the nipple 11. This pushes the seal 40 away from the retaining member or shaft 34 so that the seal 40 drops into the bottle 50, allowing it to be used as an agitator. In the embodiment shown in FIG. 3, the upper end of the push rod 20 is provided with a circular end cap 25. The end cap 25 seals the lower opening of the nipple 11 and prevents the powdered formula from entering the nipple.

Figure 4:
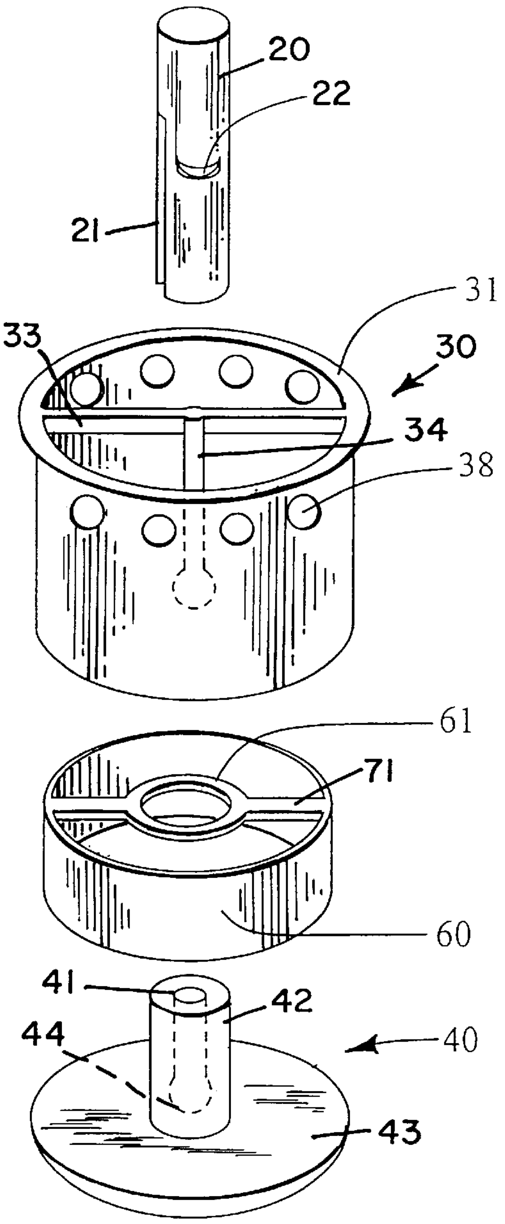
FIG. 4 is an exploded perspective view of a second modification of the insert.
Figure 5:
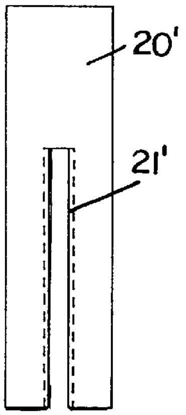
FIG. 5 is a side elevational view of a first modified actuating member portion of the insert of the present invention.
Figure 6:
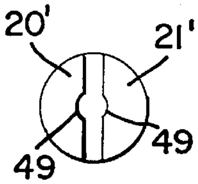
FIG. 6 is a bottom plan view of the first modified actuating member.

Infant feeding bottles are generally round and have a screw type cap. This invention however, is not restricted to being used with this type of container. An insert of any shape can be designed to be used with any comparable container. A screw-type cap is not a requirement as long as the insert is formed to provide a leak proof seal between the cap and bottle. Referring to FIG. 1, it is generally preferred that the outside diameter of the dry chamber housing 30 as measured across the outer surface 35 be just a little smaller than the inner surface of the bottle 50. If the dry chamber housing is made too large, it will bind against the inner surface of the bottle 50 and noticeably affect the ease of assembly and disassembly. If the diameter of the dry chamber housing 30 is made too small, when the bottle is inverted to dispense the formula, there will be a small amount of formula left between the outer surface 35 of the dry chamber housing and the inner surface of the bottle 50. This formula will be unusable until the bottle is disassembled. As shown in FIG. 4, this can be alleviated by using a series of relief holes 38 just below the flange 31 of the dry chamber housing 30. Using relief holes is most important when designing a general purpose insert to be used with many different bottles. This will require the use of an additional sleeve 60 to block the holes and prevent water from entering the dry chamber. The means to release the chamber seal also moves the sleeve as well as the seal 40 when the formula needs to be mixed. One way to accomplish this is by using a protruding tab 22 on the push rod 20 in conjunction with a strut 71 extending across the upper rim sleeve 60 which has a central ring 61 on the sleeve 60. The lower end of the rod 20 extends through the ring 61 for engaging the seal 40 and the tab 22 engages the ring 61 so that the seal 40 and the sleeve move downwardly simultaneously. As depicted in FIG. 1, means to release the seal 40 is provided by using a horizontal support 33 and the vertical shaft 34 that extends from the horizontal support 33. There are many other ways to release the seal. This will be discussed further on but not for the purpose of limiting the invention. As drawn, the horizontal support 33 supports the centrally located vertical shaft 34. The purpose of the vertical shaft is twofold as it is used to stabilize the push rod 20 and to hold the seal 40 in place. The push rod 20 can be manufactured with a slot 21 which is of a size and shape that allows it to slide over the horizontal support 33. Stability will be enhanced by making the vertical shaft 34 slightly larger than the horizontal support 33 and using a mating surface having grooves 49 centrally located and extending along the length of the interior of the push rod slot 21' of a first modified push rod 20' as shown in FIGS. 5 and 6. This allows the push rod 20' to slide vertically up and down the vertical shaft 34 while preventing lateral movement along the horizontal support 33. The shape of the vertical shaft 34 is not important, but a rounded shape has several advantages.

Figure 7:
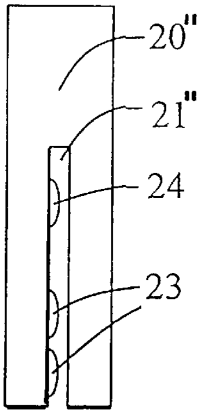
FIG. 7 is a side elevational view of a second modified actuating member portion of the insert of the present invention.
Figure 8:
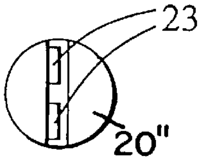
FIG. 8 is a bottom plan view of the second modified actuating member.

As shown in FIGS. 7 and 8, an example of a variation in the means to release the chamber seal 40 using the horizontal support 33 and the vertical shaft 34 is to provide a series of tabs 23 located on the bottom of the interior surface of the slot 21" of a second modified push rod slot 21". The tabs are slightly rounded on both the upper and lower surfaces to provide for easy installation and removal of the push rod 20". If the push rod is formed out of a flexible resilient material, such as thermoplastic, the user can press the push rod 20" over the horizontal support. The tabs cause the push rod slot 21" to widen slightly and then snap back together. The tabs prevent the push rod 20" from moving laterally along the horizontal support 33 and keep the push rod 20" from sliding off the horizontal support 33. Another similar set of tabs 24 may be added on the interior surface of the push rod slot 21" close to the top of the push rod slot 21". The tabs are located to allow the user to push on the nipple 11 and move the push rod 20" down until the tabs move past the horizontal support 33 and lock the push rod 20" in place. The purpose of these additional tabs is to prevent the push rod 20" from sliding back into the nipple 11, thus impeding the flow of powdered milk formula.

One of the problems associated with this type of device is the tendency for powdered formula to collect in the nipple 11 and impede the flow of milk formula. There are a few variations to the design of the push rod 20 that can be used individually or in combination to prevent this. One variation is to lengthen the push rod 20 enough to allow the top portion of the push rod 20 to extend to the top of the nipple 11. This will allow the push rod 20 to block the hole in the nipple 11 as shown in FIG. 2. The width of the push rod 20 or a portion of it can also be made wide enough to allow a seal to form between it and the inside surface of the nipple. Another suggestion for the design of the push rod 20 is to dimple the top of the push rod slightly to prevent distortion of the hole in the end of the nipple 11 when the user pushes on it to mix the ingredients.

The seal 40 should be made of an elastomeric material to allow a good seal between it and the dry chamber housing 30. The shape of the seal 40 can vary depending on personal preference and configuration. As depicted in FIG. 1, the seal 40 is mushroom shaped. The vertical shaft 34 can be made with one or more enlarged portions near the tip. If the inner surface which defines the bore 41 is formed to mate with the enlargement on the vertical shaft 34, the seal between the seal 40 and the dry chamber housing 30 can be enhanced. This will also prevent the seal 40 from inadvertently sliding along the vertical shaft 34 and compromising the seal. It is also suggested that the seal 40 be made with one or more protrusions along the bottom surface of the horizontal element 43. The purpose of these protrusions becomes more important when utilizing the optional shorter vertical shaft 34 and/or vertical element 42 discussed above. This option permits the seal 40 to slide off the end of the vertical shaft 34 allowing the seal 40 to drop into the bottle. The protrusions will prevent the bottom portion of the horizontal element 43 from blocking the passage of formula through the insert if the seal 40 becomes inverted and seats on the lower surface 36 of the dry chamber housing 35. It is suggested that the shape of the seal 40 and any protrusions allow the insert to stand vertically on a flat surface to provide a platform when filling the insert with powdered formula.

It is believed that the novelty of this invention lies in several areas. One area pertains to the concept of using an insert rather than designing a bottle with a special chamber neither of which is of any use without the other. An additional area pertains to the insert fitting between the nipple assembly 10 and the bottle 50 while still allowing the nipple assembly 10 to be directly attached to the bottle 50. This allows the insert to be used with existing bottles which is an added benefit since the consumer can use bottles they have already purchased. Many related inventions force the consumer to purchase an entire assembly with a specially made bottle which can be much more costly, especially when purchasing several units. An added benefit of the insert of the present invention is that the overall height of the bottle with the insert in place has not increased. Another novel area relates to the means to release the chamber seal being accessible by pushing the nipple. Other inventions in this area have not incorporated this principle of operation. An additional area relates to the use of the push rod 20 to seal the nipple 11 to prevent the powdered formula from caking up in it. A further novel area relates to the seal 40 and dry chamber housing 30 together form a very compact assembly which allows the user to stand the assembly vertically on a flat surface to provide a platform when filling the it with powdered formula. Much of the frustration of feeding a child on the road from a large can of formula can be eliminated by providing an optional lid to seal the top of the dry chamber housing. In anticipation of being on the road, the user attaches the seal 40 to the dry chamber housing 30 of one or several units and sets them on a flat surface. Each unit is filled with a measured amount of powdered formula and the optional lid is placed on the top of the dry chamber housing 30 forming a compact carrier. The optional lid could provide a clip to hold the push rod 20, keeping all of the parts together. To use the apparatus with the optional lid in place, the user simply slides the insert into the bottle 50 and then removes the push rod 20 from the lid. The lid is removed and the push rod 20 is put in place on the dry chamber housing 30 followed by the attachment of the nipple assembly 10. Other novel areas should be apparent from the drawing as well as the description.

Figure 9:
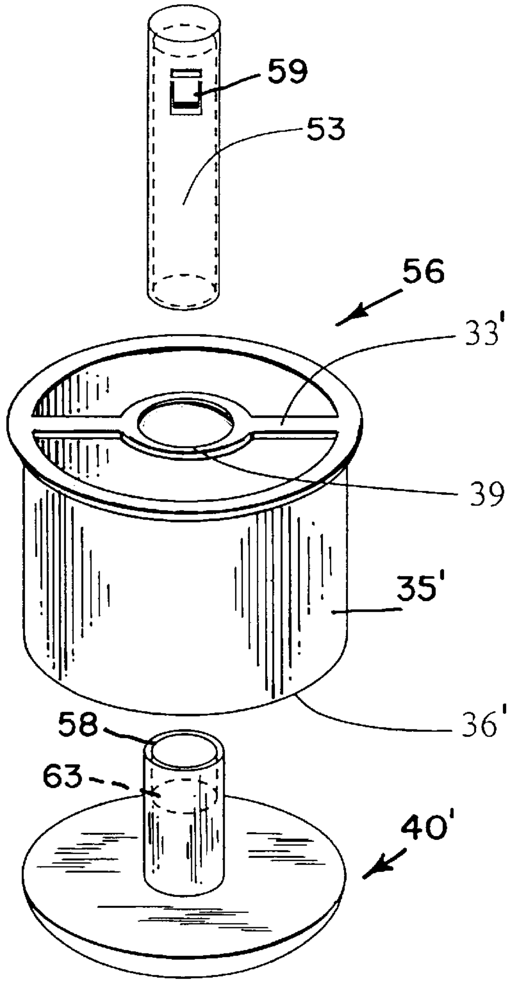
FIG. 9 is an exploded perspective view of a third modification of the insert.
Figure 10:
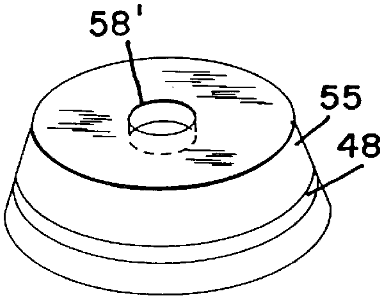
FIG. 10 is a perspective view of a modified closure portion of the insert of the present invention.
Figure 11:
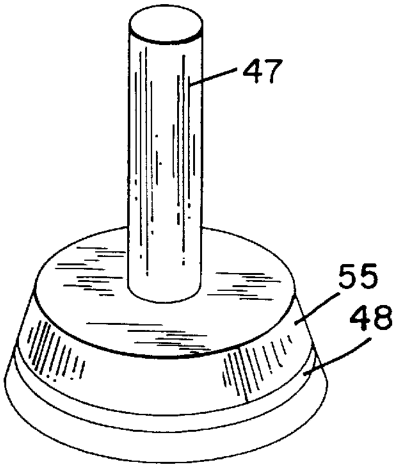
FIG. 11 is a perspective view of the modified closure portion of FIG. 10 combined as a single piece with a third modified actuating member.
Figure 12:
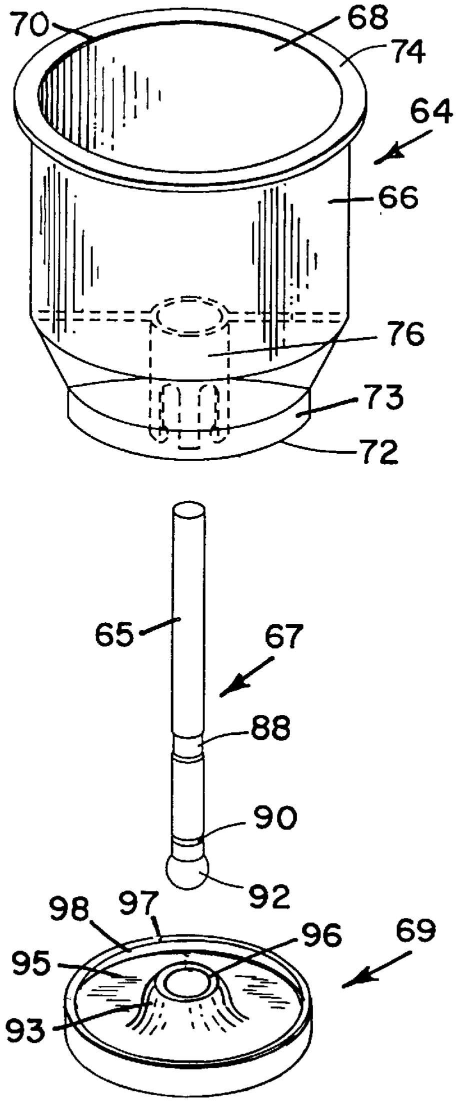
FIG. 12 is an exploded perspective view of a fourth modified insert of the present invention.
Figure 13:
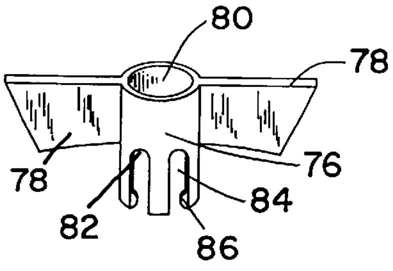
FIG. 13 is a perspective view of a supporting structure within the housing of the fourth modified insert.
Figure 14:
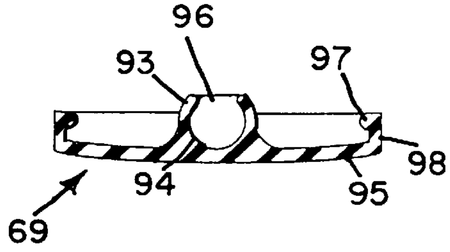
FIG. 14 is a vertical cross-sectional view of the closure portion of the fourth modified insert.

There are many variations that may be employed in the design of the insert. It is believed that this design with a separate push rod 20 and combination of horizontal support 33 with a vertical shaft 34 is the most useful and sturdy. Several other variations are discussed here but not for the purpose of limiting the invention. For example, FIG. 9 shows a third embodiment of the insert, generally indicated by the reference numeral 56. An elastomeric closure or seal, generally indicated by the reference numeral 40', has a vertical portion 42' which contains a cavity 63 and a top opening 58 to the cavity. The housing 35' has a bottom opening 36'. The housing 35' has a horizontal support 33' which includes a central ring 39 designed to fit around an actuator or the push rod 53. The push rod 53 slides vertically within the ring 39 and is also prevented from moving laterally. Multiple supports could also be used. The rod 53 has a laterally extending spring clip 59 which enables the rod 53 to be yieldingly supported on the ring 39. The lower end of the rod 53 fits snugly in the cavity 63 to support the seal 40' and maintain the seal in sealing position to close the bottom opening 36'. when the push rod 53 is pushed downwardly through the nipple, the clip 59 is forced past the ring 39 and causes the seal 40' to move downwardly away from the opening 36'. Additionally, FIG. 10 shows a modified chamber seal or closure 55 which uses an added annular ridge 48 or 0-ring of elastomeric material located around the outer perimeter of the seal which seats along the lower inner surface 36 of the dry chamber housing 35 and holds the seal in place. Ridge 48 eliminates the need for a vertical element on the chamber seal 55 but would bind more and require additional force to release the seal. Seal 55 has a bore 58' for receiving the lower end of a push rod 47, as shown in FIG. 11. The seal 55 is self supporting on the housing and also supports the push rod 47. Furthermore, the seal 55 and push rod 47 can be formed into one piece. The seal 55 eliminates the need for a vertical shaft 34 and/or horizontal support 33. This configuration could be utilized with or without a horizontal support 33. Using the horizontal support 33 would most likely employ the centrally located circular or otherwise shaped surface for guiding the rod 47. Another variation to the design would employ a screw thread on the push rod 47 and a circular guide on the horizontal support 33. In this configuration, the seal 40 would be released by rotating and/or pushing on the push rod 47. Further variations may be employed in the design of the insert but none that will appreciably change the fundamental design.

Referring to FIGS. 12–18, there is a shown a fourth modified insert, generally indicated by the reference numeral 64 and comprising a housing 66, an actuator or push rod, generally indicated by the reference numeral 67, and a closure or dry chamber seal, generally indicated by the reference numeral 69.

The housing 66 is generally cylindrical and has a cylindrical dry chamber or compartment 68 having a top opening 70 and a bottom opening 72. The housing 66 has an annuler vertical outer surface 73 adjacent the bottom opening 72. A cylindrical support tube 76 is located within the compartment 68 just above the bottom opening 72. The support tube 76 is supported in a fixed position within the compartment 68 by a pair of support brackets 78 that are fixed to the inner side surface of the housing. The support tube 76 has a top opening 80 and a bottom opening 82. A plurality of fingers 84 extend downwardly from the bottom opening 82 toward the bottom opening 72 of the housing. The lower end of each finger 84 has an inwardly facing tab 86, see FIG. 13.

The actuator 67 comprises a cylindrical push rod 65 and a bulbous enlargement 92 at the lower end of the rod 65. The rod 65 has a lower annular groove 90 just above the enlargement 92, an upper groove 88 spaced from and located above the lower annular groove 90.

The closure 69 has a circular bottom wall 95 and annular vertical side wall 98 open at the top and extending upwardly from the bottom wall 95. A bulbous protrusion 93 extends upwardly from the center of the bottom wall 95 to a point just above the top of the side wall 98. The protrusion 93 has a generally spherical cavity 94 having a top reduced opening 96. The closure 69 is made of an elastomeric material, such as natural or synthetic rubber.

Figure 15:
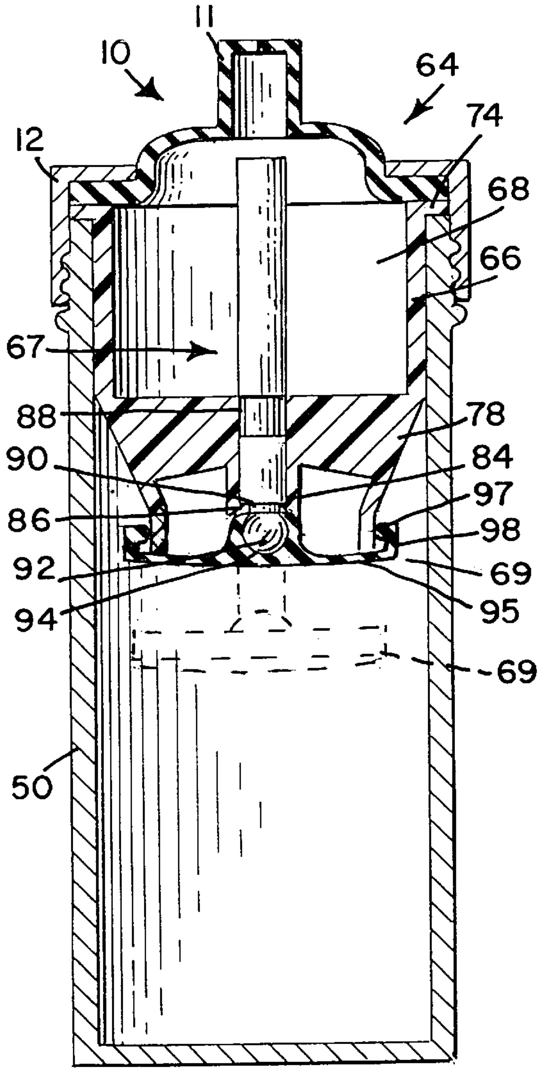
FIG. 15 is a vertical cross-sectional view of the fourth modified insert shown installed within the chamber of an infant feeding bottle.
Figure 16:
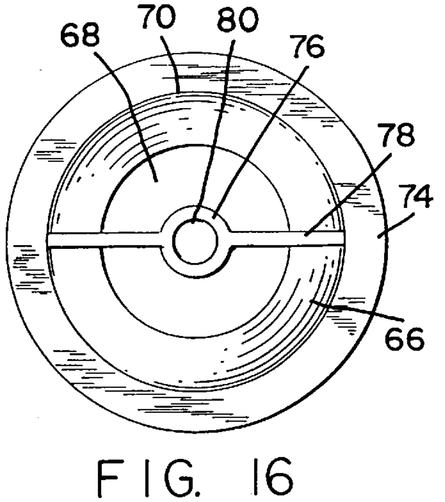
FIG. 16 is a top plan view of the housing portion of the fourth modified insert.
Figure 17:
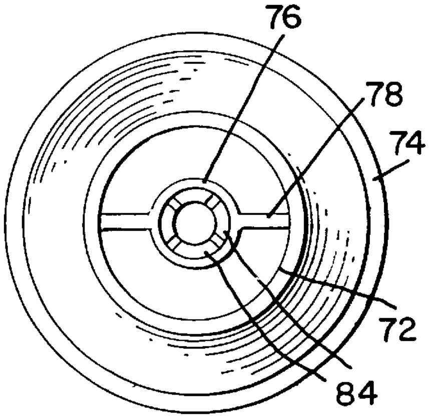
FIG. 17 is a bottom plan view of the housing portion of the fourth modified insert.
Figure 18:
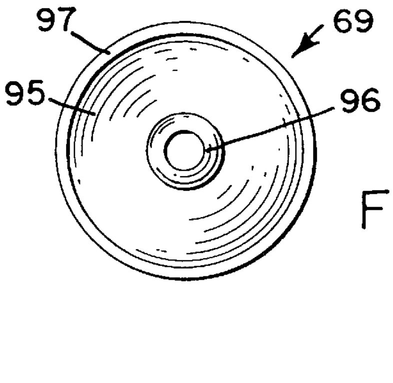
FIG. 18 is, a top plan view of the closure portion of the fourth modified insert.

Referring particularly to FIG. 15, the fourth modified insert 64 is shown installed within the chamber 57 of the bottle 50 so that the flange 74 rest on the upper rim or lip 51 of the bottle. The nipple assembly 10 rests on the flange 74 and is screwed onto the upper neck of the bottle. Prior to installation of the fourth modified insert 64 within the bottle 50, the insert is assembled by forcing the bulbous enlargement 92 of the actuator 67 into the cavity 94 through the upper opening 96. The actuator 67 remains connected to the closure 69 and, if desired, can be permanently fixed to the closure, as for example by gluing. The push rod 65 is pushed upwardly through the support tube 76 so that the side wall 98 of the closure surrounds the annular outer surface 73 of the housing and bead 97 is in sealing contact with the outer surface 73, as shown in FIG. 15. When the closure 69 is in the sealing or closed position, as shown in FIG. 15, the tabs 86 project into the lower groove 90 of the push rod 65 to maintain the closure 69 in the closed position. Due to the elastomeric nature of the closure 69, it is self supporting on the outer surface 73. The tabs 86 also support the closure 69 in the closed position and can also function as the sole support for a closure design that is not self supporting. The compartment 68 is filled with dry powder formula and the insert 64 has positioned within the chamber of the bottle, as described above.

Just prior to feeding the infant, the user pushes on or the push rod 65 through the nipple 11 to apply downward force to the upper end of the push rod, thereby forcing the tabs 86 out of the lower groove 90 and forcing the bead 97 away from the annular outer surface 73 of the housing. This enables the actuator 67 and closure 69 to fall as a unit below the bottom opening 72 of the housing until the tabs 86 engage the upper groove 88 of the push rod to limit the decent of the closure 69 to the dotted line position shown in FIG. 15. It is also contemplated that the upper end of the push rod 65 could be provided with an enlargement for contacting the upper edge of the support tube. The enlargement could be attached to the push rod 65 after assembly of the push rod into the housing or could be a removable tight fitting O-ring. When the closure 69 drops to the lower or dotted line position, as shown in FIG. 15, the powdered formula in the compartment 68 of the housing drops into the chamber 57 of the bottle, wherein it can be mixed with the liquid within the chamber of the bottle by shaking the bottle.

Figure 19:
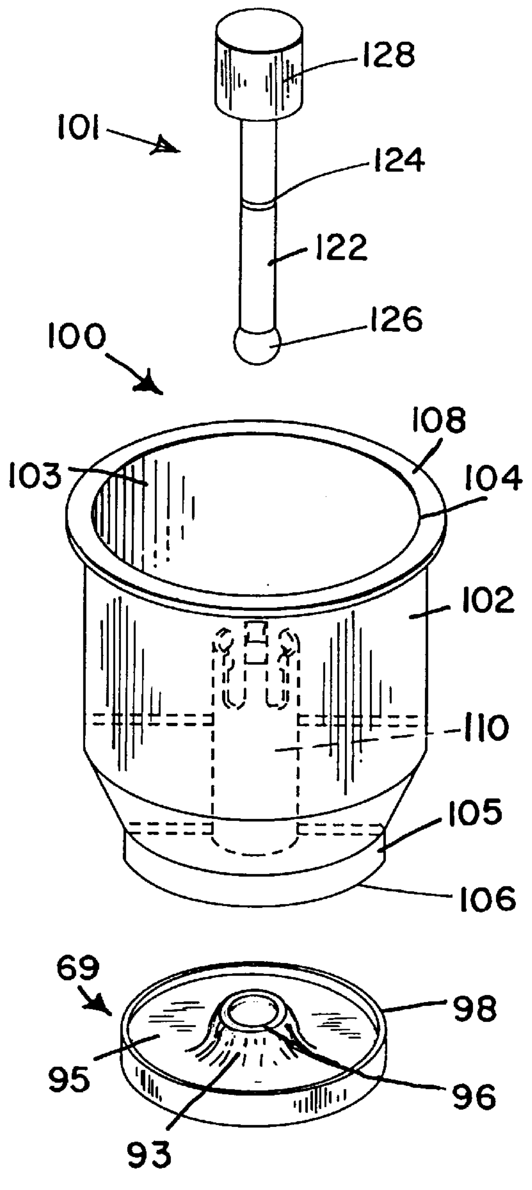
FIG 19 is an exploded perspective view of a fifth modified insert.
Figure 20:
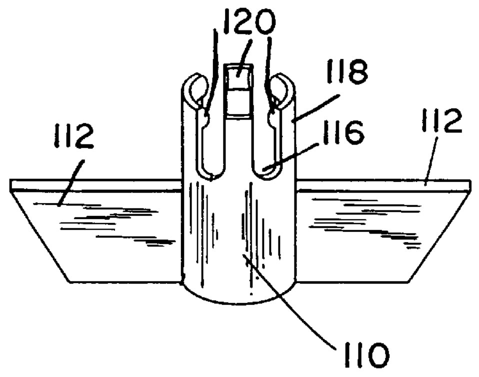
FIG. 20 is a perspective view of a supporting structure within the housing of the fifth modified insert.

Referring to FIGS. 19 and 20, there is shown a fifth modified insert, generally indicated by the reference numeral 100 and comprising a generally cylindrical housing 102, an actuator, generally indicated by the reference numeral 101, and the previously described closure 69.

The housing 102 has a compartment 103 for storing dried powder formula, a top opening 104 to the compartment and a bottom opening 106 to the compartment. An annular vertical outer surface 105 is located adjacent the bottom opening 106. An annular horizontal flange 108 extends outwardly from the outer surface of the housing 102 at the top opening 104. A support tube 110 is located within the compartment 103 just above the bottom opening 106. The support 110 is supported in a fixed position within the compartment 103 by a pair of support brackets 112 which are fixed to the inner wall of the compartment 103. The support tube 110 has a bottom opening 1 14 and a top opening 116. A plurality of vertical fingers 118 extend upwardly from the support tube 110 at the top opening 116. The upper free end of each finger 118 has an inwardly extending tab 120.

The actuator 101 includes a cylindrical push rod 122, a bulbous enlargement 126 at the bottom end of the rod 122, and an end cap 128 at the upper end of the rod 122. An annular groove 124 is located between the enlargement 126 and the end cap 128.

The insert 100 is assembled by positioning the closure 69 on the annular surface 105 of the housing so that the annular bead 97 engages the outer surface 105 in a tight sealing relationship. The actuator 101 is inserted through the support tube 110 through the top opening 116 and the enlargement 126 is forced into the cavity 94 through the opening 96 of the closure 69. Thereafter, the actuator 101 and the closure 69 function as a single unit. If desired, the actuator 101 and the closure 69 can be fixed permanently, as for example by gluing. When the closure 69 is in the upper sealing or closed position, the tabs 120 extend into the groove 124 to help maintain the closure 69 in its upper closed position.

The insert 100 is filled with powdered formula and inserted into the chamber 57 of bottle 50 in the same manner as described for the fourth modified insert 64. Prior to feeding the baby, the user pushes down on the nipple 11, thereby engaging the end cap 28 and pushing the rod 122 and closure 69 downwardly. The closure 69 moves away from the bottom opening 106 and releases powdered formula into the chamber 57 of the bottle. As the actuator 101 and the closure 69 move downwardly, the end cap 128 strikes the upper ends of the fingers 118 so that the actuator is supported on the finger 118, thereby determining the lower position of the closure 69. If desired, the rod 122 can be made sufficiently long so that the end cap 128 blocks the bottom opening of the nipple 11 when the closure 69 is in its upper position against the annular surface 105 of the housing.

Referring to FIGS. 21–24, there is shown a sixth modified insert, generally indicated by the reference numeral 130, which includes a generally frusto-conical housing 132, an actuator, generally indicated by the reference numeral 134, and a closure, generally indicated by the reference numeral 136.

The housing 132 has a compartment 138 having a top opening 140 and a bottom opening 142. An annular horizontal flange 144 extends outwardly from the top opening 140. The housing 132 has an annular vertical surface 143 just above the bottom opening 142. This enables the housing 132 to receive a self supporting closure, such as closure 69 shown in the fourth modified insert 64. A vertical wall 146 spans the compartment 138. A pair of spaced guide ribs 148 are located on opposite surfaces of the wall 146 at the center of the wall. A tab 150 is located between each pair of guide ribs near the lower end of the wall 146.

The closure 136 is generally disc shaped and is made up of elastomeric material. The closure 136 has an upper surface 164 that has a top opening 168 to a generally spherical cavity 160 within the closure 136.

The actuator 134 comprises a vertical cylindrical push rod 152, a spherical enlargement 160 at the lower end of the rod, and a disc shaped end cap 162 at the upper end of the rod. The rod 152 has a vertical slot 154 which extends from an upper end surface 155 down to the enlargement 160. The enlargement 160 is split along the vertical line 161. Line 161 intersects the slot 154 so that the lower portion of the rod 152 is bifurcated. The actuator 134 is made up of a resilient flexible material, such as thermoplastic, which enables the two lower halves of the rods 152 to separate away from the line 161 for enlarging the slot 154.

Figure 21:
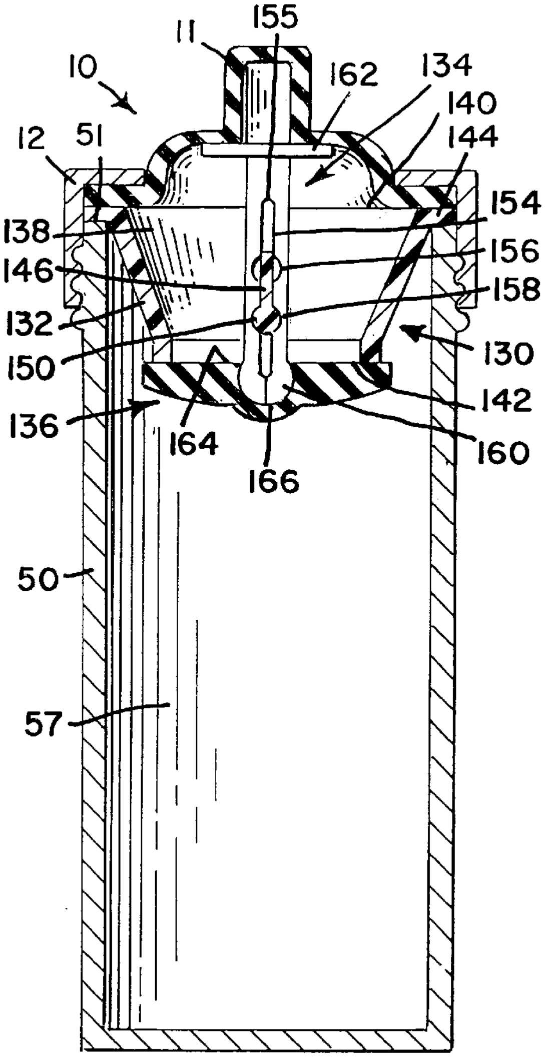
FIG. 21 is a vertical cross-sectional view of a sixth modified insert shown installed within an infant feeding bottle.
Figure 22:
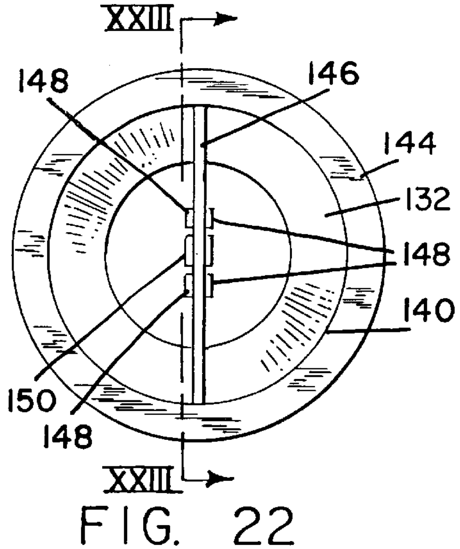
FIG. 22 is a top plan view of the housing portion of the sixth modified insert.
Figure 23:
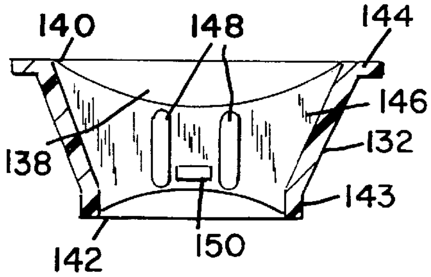
FIG. 23 is a vertical cross-sectional view taken along the line XXII—XXII of FIG. 22, and looking in the direction of the arrows.
Figure 25:
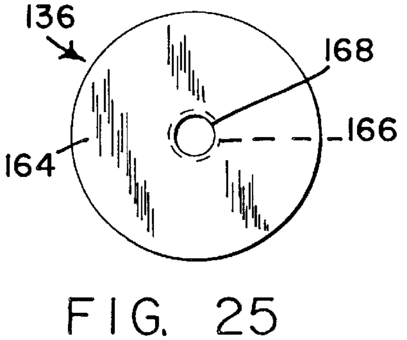
FIG. 25 is a top plan view of closure portion of the sixth modified insert.
Figure 24:
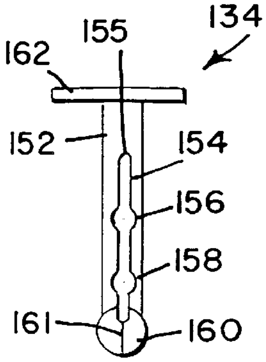
FIG. 24 is a side elevational view of the actuator portion of the sixth modified insert.

The insert 130 is assembled by separating the halves of the rod 152 and applying the rod to the wall 146 so that the two halves of the wall straddle the wall between the guide ribs 148 and the wall 146 is located within the slot 154. The closure 136 is applied to the lower end of the actuator 134 so that the enlargement 160 is forced into the cavity 166 through the opening 168. The lower surface 164 of the closure 136 is positioned against the lower edge of the housing 132, thereby closing the bottom opening 142. When the closure 136 is in the upper closing or sealing position, the tabs 150 is located within the lower enlarged portion 158, thereby maintaining the closure 136 in its upper closed position, as shown in FIG. 21.

The insert 130 is inserted into the chamber 57 of the infant feeding bottle 50, in the same manner as for previously described insert embodiments. When the insert 130 is positioned within the bottle 50, the end cap 162 abuts the lower end of the nipple 11 and seals the lower opening of the nipple, thereby preventing powdered formula from entering the nipple. Powered formula is released into the chamber 57 by pressing downwardly on the elastomeric nipple 11 so that the end cap 62 is pushed downwardly. Downward pressure on the rod 152 causes the tab 150 to move out of the enlarged portion 158 and causes the closure 136 move downwardly from its upper closed or sealing position to its lower open or dispensing position. The lower dispensing position is determined when the upper enlarged portion 156 reaches the tab 150, thereby maintaining the closure 136 in its lower dispensing position. With the closure 136 so positioned, the powdered formula material is released from the compartment 146 into the chamber 57 of the bottle. Once that the elements of the insert 130 are assembled, the enlargement 160 can be permanently fixed to the closure 136, if desired. The two halves of the rod 152 have sufficient flexibility to separate for enabling the tab 150 to occupy either of the enlargements 156 and 158. The surface 155 at the upper end of the slot 154 provides an absolute stop for limiting the downward travel of the rod 152.

I claim:

1. An insert for an infant feeding bottle having a chamber, an upper end for receiving a nipple assembly removably connected to the upper end of the bottle, said nipple assembly including an elastomeric nipple which has a bottom opening, said upper end having an upper access opening to the chamber and an annular rim surrounding the upper access opening, said insert comprising:

(a) a housing having a compartment for storing powdered formula, a top opening to the compartment and a bottom to the compartment, said housing being adapted to be inserted into the chamber of said bottle and to be supported on the bottle so that the top opening of said compartment is exposed to the bottom opening of said housing is exposed to said chamber, said housing having an annular outer vertical surface at said bottom opening;

(b) a closure being movable from an upper position for closing the bottom opening of said housing for isolating said compartment from said chamber and a lower position in which said closure is spaced from said bottom opening for connecting said chamber to said compartment and to the bottom opening of said nipple, said closure having an annular vertical wall located outside of said annular vertical surface when said closure is in the upper position, said closure having an annular elastomeric bead extending inwardly from said annular vertical wall for engaging said annular vertical surface in telescoping sealing relationship when said closure is in its upper position; and (c) an actuator having a lower end connected to said closure so that said closure and said actuator move as a unit said actuator having an upper end which extends above the top opening of said housing for being positioned below said nipple, one of said closure and said actuator being releasable connected to said housing so that said closure is releasable maintained in its upper position for sealing the bottom opening, said actuator being guided on said housing for vertical movement relative to said housing so that said actuator can be pushed downwardly from said nipple for moving said closure downwardly from its upper position to its lower position.

2. An insert for an infant feeding bottle having a chamber, an upper end for receiving a nipple assembly removably connected to the upper end of the bottle, said nipple assembly including an elastomeric nipple which has a bottom opening, said upper end having an upper access opening to the chamber and an annular rim surrounding the upper access opening, said insert comprising:

(a) a housing having a compartment for storing powdered formula, a top opening to the compartment and a bottom opening to the compartment, said housing being adapted to be inserted into the chamber of said bottle and to be supported on the bottle so that the top opening of said compartment is exposed to the bottom opening of said housing is exposed to said chamber, said housing having a guide structure located in a fixed position within said chamber;

(b) a closure being movable from an upper position for closing the bottom opening of said housing for isolating said compartment from said chamber and a lower position in which said closure is spaced from said bottom opening for connecting said chamber to said compartment and to the bottom opening of said nipple;

(c) an actuator slidably mounted on said guide structure, said actuator having a lower end connected to said closure so that said closure and said actuator move as a unit, said actuator having an upper end which extends above the top opening of said housing for being positioned below said nipple, one of said closure and said actuator being releasable connected to said housing so that said closure is releasable maintained in its upper position for sealing the bottom opening, said actuator being guided on said housing for vertical movement relative to said housing so that said actuator can be pushed downwardly from said nipple for moving said closure downwardly from its upper position to its lower position; and (d) detent means operatively connected to said guide structure and said actuator for yieldingly maintaining said closure in its upper position.

3. An insert as recited in claim 2, wherein said guide structure is a vertical wall having a central vertical aperture and said actuator has a vertical rod slidably mounted within said vertical aperture.

4. An insert as recited in claim 3, wherein said vertical rod has an outer vertical surface and said detente means comprises, a depression in the outer vertical surface of said rod and a vertical resiliently yieldable finger having a first end fixed to said vertical wall and a free second end having an inwardly facing protuberance for engaging said depression.

5. An insert as recited in claim 4, wherein said depression is an annular groove and there is a plurality of said resiliently yieldable fingers.

6. An inset as recited in claim 5, wherein said insert further comprises a stop for preventing said closure from moving downwardly below its lower position.

7. An insert as recited in claim 6, wherein said depression is a lower depression and said stop is an upper depression located above said lower depression for receiving said protuberance when said closure is in its lower position.

8. An insert for an infant feeding bottle having a chamber, an upper end for receiving a nipple assembly, said nipple assembly having and elastomeric nipple which has a bottom opening, said upper end having an upper access to the chamber and an annular rim surrounding the upper access opening, said insert comprising:

(a) a housing having a compartment for storing powdered formula, a top opening to the compartment, and a bottom opening to the compartment, said housing being adapted to be inserted into the chamber of said bottle so that said bottom opening is exposed to said chamber and said housing is supported on the bottle so that the top opening to said compartment is exposed to the bottom opening of said nipple, said housing having an outer annular vertical surface adjacent said bottom opening;

(b) a closure having an annular wall located outside of said outer annular vertical surface when said closure is in its upper position, said closure having an annular elastomeric bead extending inwardly from said annular vertical wall for frictionally engaging said annular vertical surface in a telescoping relationship for releasably maintaining said closure on said housing to close the bottom opening of said housing and to isolate said chamber from said compartment, and (c) an actuator supported by said housing for downward movement toward said closure to enable said closure to be pushed downwardly against said closure for moving said closure downwardly away from said bottom opening to expose said chamber to said the bottom opening of said nipple.

* * * * *